United States Patent
Lenz et al.

(10) Patent No.: US 10,576,878 B2
(45) Date of Patent: Mar. 3, 2020

(54) ILLUMINATION DEVICE HAVING ELONGATED LIGHT PIPE AND ONE OR MORE ATTACHMENT WINGS

(71) Applicant: Rebo Lighting & Electronics, LLC, Ann Arbor, MI (US)

(72) Inventors: Orin Lenz, Canton, MI (US); Stephen McCarthy, Ann Arbor, MI (US); Todd Irgang, Saline, MI (US)

(73) Assignee: Rebo Lighting & Electronics, LLC, Ann Arbor, MI (US)

( * ) Notice: Subject to any disclaimer, the term of this patent is extended or adjusted under 35 U.S.C. 154(b) by 284 days.

(21) Appl. No.: 15/425,492

(22) Filed: Feb. 6, 2017

(65) Prior Publication Data
US 2018/0222380 A1   Aug. 9, 2018

(51) Int. Cl.
| | | |
|---|---|---|
| *B60Q 1/32* | (2006.01) | |
| *B60R 3/00* | (2006.01) | |
| *G02B 1/04* | (2006.01) | |
| *F21V 8/00* | (2006.01) | |

(52) U.S. Cl.
CPC .............. *B60Q 1/323* (2013.01); *B60R 3/002* (2013.01); *G02B 1/045* (2013.01); *G02B 6/001* (2013.01); *G02B 1/04* (2013.01)

(58) Field of Classification Search
CPC ........ B60Q 1/323; B60Q 1/24; B60Q 1/2696; G02B 1/045; G02B 6/001; G02B 1/04
USPC ......................................................... 362/511
See application file for complete search history.

(56) References Cited

U.S. PATENT DOCUMENTS

| | | | |
|---|---|---|---|
| 4,763,980 A | 8/1988 | Gerber | |
| 6,186,649 B1 * | 2/2001 | Zou | ........................ F21V 7/005 362/217.05 |
| 6,616,313 B2 | 9/2003 | Furst et al. | |
| 7,527,386 B1 | 5/2009 | Salinas Fox | |
| 8,075,173 B2 | 12/2011 | Shallcross | |
| 8,142,061 B2 | 3/2012 | Jablonski | |
| 2004/0179358 A1 | 9/2004 | Tufte | |

(Continued)

FOREIGN PATENT DOCUMENTS

| | | |
|---|---|---|
| CN | 203836712 U | 9/2014 |
| CN | 104296089 A | 1/2015 |
| CN | 204172758 U | 2/2015 |

(Continued)

OTHER PUBLICATIONS

US 5,471,379 A1, 10/2002, Bucher (withdrawn)

(Continued)

*Primary Examiner* — Anh T Mai
*Assistant Examiner* — Hana S Featherly
(74) *Attorney, Agent, or Firm* — Reising Ethington, P.C.

(57) ABSTRACT

An illumination device that includes an elongated light pipe and attachment wings integrally formed on the sides of the light pipe so that the illumination device can be easily, yet securely, installed within a containment channel, such as those found on the underside of a vehicle step rail. The elongated light pipe is made of an optically transmissive material, the attachment wings are made of a different resilient material, and the overall device is a single extruded component that has a co-extrusion boundary separating the two materials. The illumination device illuminates the ground, for example, when passengers are entering or exiting the vehicle.

20 Claims, 4 Drawing Sheets

(56) References Cited

U.S. PATENT DOCUMENTS

2016/0082879 A1    3/2016    Kozole et al.

FOREIGN PATENT DOCUMENTS

| CN | 204494254 U | 7/2015 |
| CN | 104964203 A | 10/2015 |
| JP | 20030146148 A | 5/2003 |
| JP | 2009140758 A | 6/2009 |
| WO | 2007047304 A1 | 4/2007 |

OTHER PUBLICATIONS

International Search Report Issued for PCT/US2018/017063 dated May 17, 2018.
International Preliminary Report on Patentability Issued for PCT/US2018/017063.

* cited by examiner

ILLUMINATION DEVICE HAVING ELONGATED LIGHT PIPE AND ONE OR MORE ATTACHMENT WINGS

FIELD

The present invention generally relates to an illumination device and, more particularly, to an illumination device for installation on a vehicle, such as on the underside of a vehicle step rail.

BACKGROUND

Step rails and other vehicle components are sometimes designed to provide exterior lighting for when a user is entering and/or exiting the vehicle. For example, some step rail illumination devices include a series of individual lamps (e.g., light-emitting diodes (LEDs)) that are mounted on the underside of the step rail and emit light downwards so as to provide ground illumination; these devices are referred to here as 'multi-lamp' devices. Typically, each lamp in a multi-lamp device is mounted in an individual socket, is connected to other lamps by way of wire harnesses, and produces a localized light pattern beneath the lamp.

Although this type of arrangement may be useful for certain applications, it may also come with certain drawbacks. For instance, multi-lamp devices can sometimes produce a non-uniform light pattern underneath the device that undesirably includes a series of bright and dark spots corresponding to the different locations of the lamps; the non-uniformity of such a pattern can become exacerbated if one or more of the lamps burns out or otherwise malfunctions. In addition, multi-lamp devices with a series of interconnected lamps and wire harnesses can be expensive and difficult to install and connect.

The illumination device described below was designed with some of the aforementioned considerations in mind.

SUMMARY

According to one embodiment, there is provided an illumination device for installation in a containment channel, comprising: an elongated light pipe made of an optically transmissive material and having a reflecting side that reflects light within the light pipe, an illuminating side that allows light to escape the light pipe, a first attachment side, and a second attachment side; a first attachment wing made of a resilient material and having a first bridge portion that connects the first attachment wing to the first attachment side of the elongated light pipe, a first arm portion that extends away from the first bridge portion, and a first leg portion that extends away from the first bridge portion; and a second attachment wing made of a resilient material and having a second bridge portion that connects the second attachment wing to the second attachment side of the elongated light pipe, a second arm portion that extends away from the second bridge portion, and a second leg portion that extends away from the second bridge portion. The illumination device is configured so that, during installation of the illumination device in the containment channel, the first and second attachment wings resiliently snap into the containment channel and securely maintain the illumination device in place.

According to another embodiment, there is provided an illumination device for installation in a containment channel, comprising: an elongated light pipe made of an optically transmissive material and having a reflecting side that reflects light within the light pipe, an illuminating side that allows light to escape the light pipe, and at least one attachment side; and at least one attachment wing made of a resilient material and having a bridge portion that integrally joins the attachment wing to the attachment side of the elongated light pipe, the attachment wing is configured to help secure the illumination device in the containment channel. The illumination device is a single extruded component that has a co-extrusion boundary separating the optically transmissive material of the elongated light pipe from the resilient material of the attachment wing.

According to yet another embodiment, there is provided a method of manufacturing an illumination device, comprising the steps of: providing an optically transmissive material to an extruding machine; providing a resilient material to the extruding machine; co-extruding the optically transmissive material and the resilient material to form a single extruded component that includes an elongated light pipe, at least one attachment wing, and a co-extrusion boundary separating the optically transmissive material from the resilient material; and severing the co-extruded material at an axial end. The elongated light pipe is formed from the optically transmissive material and has a reflecting side that reflects light within the light pipe, an illuminating side that allows light to escape the light pipe, and at least one attachment side. The attachment wing is formed from the resilient material and has a bridge portion that integrally joins the attachment wing to the attachment side of the elongated light pipe, the attachment wing is configured to help secure the illumination device in a containment channel. The co-extrusion boundary is located in the bridge portion of the attachment wing.

DRAWINGS

Preferred exemplary embodiments will hereinafter be described in conjunction with the appended drawings, wherein like designations denote like elements, and wherein.

DESCRIPTION

An illumination device is described herein that includes an elongated light pipe and one or more attachment wing(s) integrally formed on the sides of the light pipe so that the illumination device can be easily, yet securely, installed within a containment channel, such as the type found on the underside of a vehicle step rail. The elongated light pipe is made of an optically transmissive material, the attachment wing(s) are made of a different resilient material, and the overall device is a single extruded component that has a co-extrusion boundary separating the two materials. The illumination device may be used in vehicle and/or non-vehicle applications, in vehicle interior and/or exterior applications, as well as in a number of different vehicle applications, to cite a few possibilities. The vehicle step rail embodiment described below is merely one possibility, as other applications may include other vehicle exterior lighting applications (e.g., those in bumpers, truck beds, body panels, etc.), vehicle interior lighting applications (e.g., those in interior trim, door and roof panels, instrument panels, etc.), as well as lighting applications for buildings (e.g., down or track lighting, accent lighting, etc.). Further, vehicle implementations are not limited to pickup trucks (as shown in FIG. 1), as the illumination device may be used on any sports utility vehicle (SUV), cross-over vehicle, passenger vehicle, motorcycle, marine vehicle, aircraft, all-terrain vehicle, etc.

Figure 1:
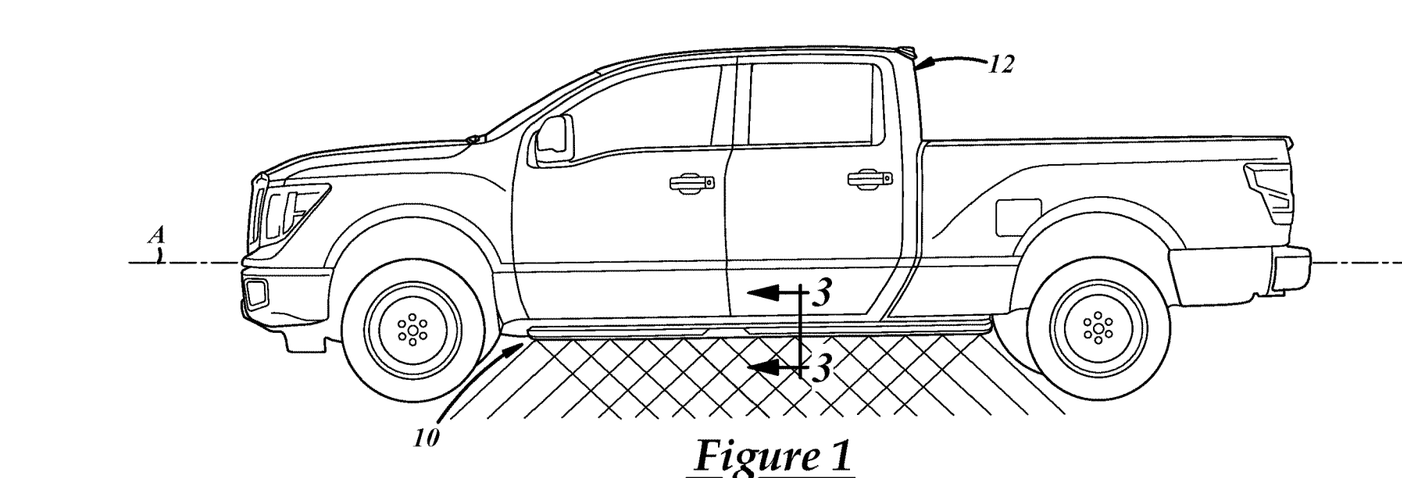
FIG. 1 is a side view of a vehicle with a step rail assembly that includes an embodiment of the present illumination device mounted on its underside.
Figure 2:
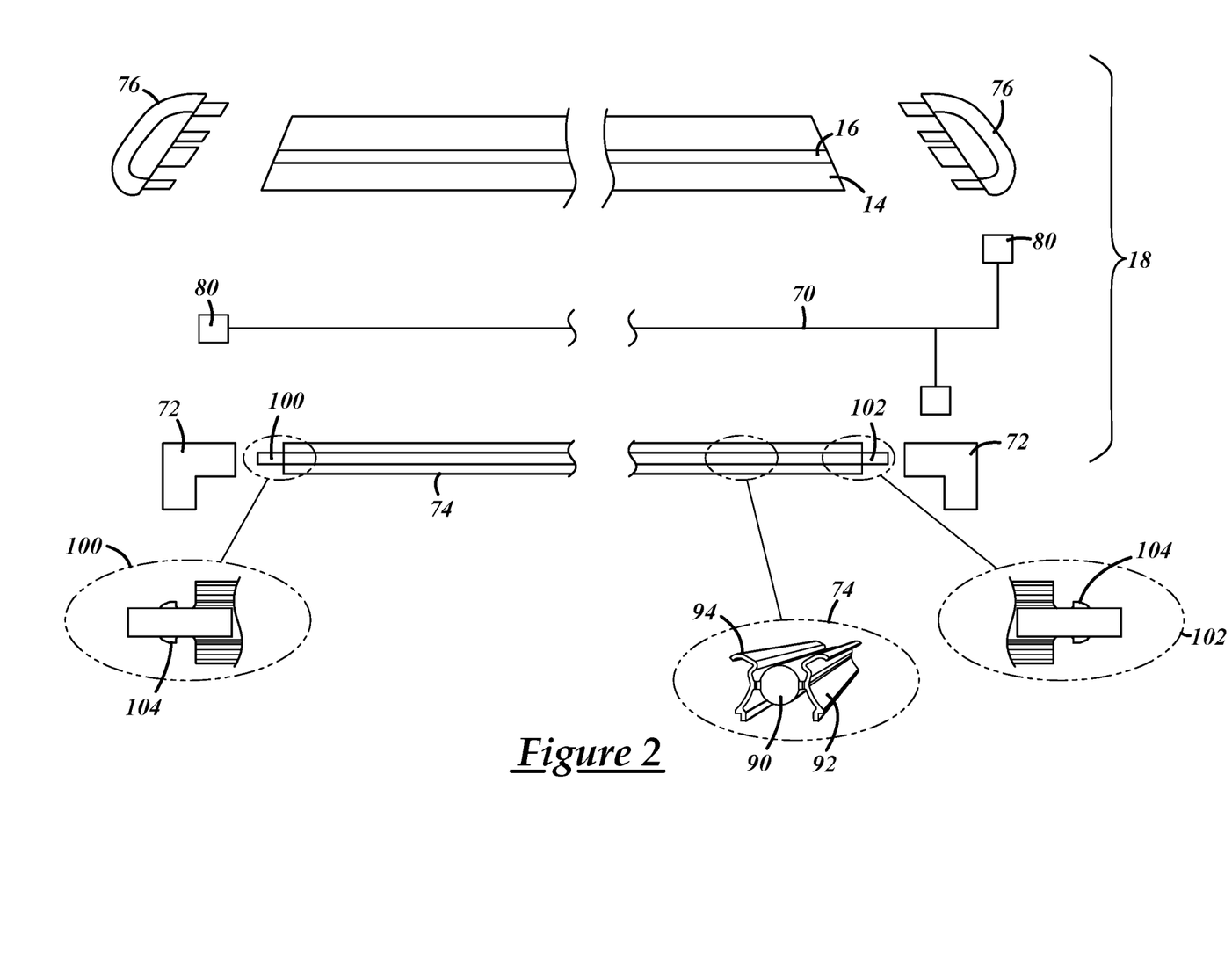
FIG. 2 is an exploded schematic view of the step rail assembly shown in FIG. 1.
Figure 3:
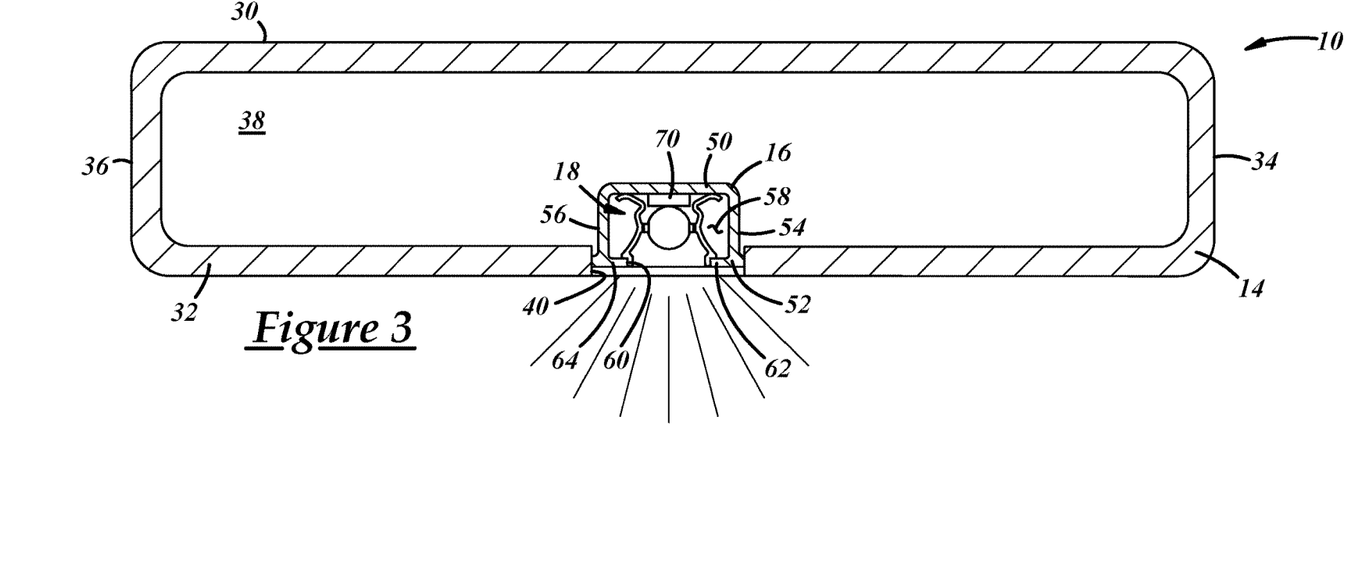
FIG. 3 is a cross-sectional view of the step rail assembly shown in FIG. 1 along section lines 3-3.

The exemplary step rail assembly 10 shown in FIGS. 1-3 is mounted on a vehicle 12 and includes a step rail 14, a containment channel 16, and an illumination system 18. The step rail 14, also referred to as a 'running board', is an elongated component that typically extends along a length of the vehicle 12 (e.g., under front and/or rear passenger doors) and includes an upper surface 30 for passengers to step on as they enter or exit the vehicle, as well as a lower surface 32, side surfaces 34, 36, and an interior space 38. In this particular embodiment, the step rail 14 has a rectangular cross-sectional shape and the lower surface 32 includes an opening or slot 40 that extends along a length of the step rail and is designed to accommodate the containment channel 16 so that the illumination system 18 can emit light downwards towards the ground, as illustrated in FIGS. 1 and 3.

Containment channel 16 is also an elongated component that extends for a length of the step rail 14 and similarly includes an upper surface 50, a lower surface 52, side surfaces 54, 56, and an interior space 58. Like the larger step rail 14, the containment channel 16 may also have a generally rectangular cross-sectional shape where the lower surface 52 includes an opening or slot 60 that extends along a length of the containment channel and is designed to accommodate the illumination system 18. As best illustrated in FIG. 3, the lower surface 52 of the containment channel 16 includes a pair of flanges 62, 64 that are parallel to and are separated from one another across the width of the opening 60.

In one embodiment, the step rail 14 is manufactured separate from the containment channel 16 so that the two components can later by welded, bolted or otherwise secured to one another. The step rail 14 and/or the containment channel 16 may be made from aluminum, an aluminum-based alloy, or some other suitable material. The cross-sectional shape of the step rail 14 and/or the containment channel 16 may be rectangular, as shown and described, but this is not required. Because step rails and their installation on vehicles are generally known in the art, they will not be described further here. It should be appreciated that terms of relative direction and position, such as "upper," "lower," "front," "rear," "above," "below," and the like are generally used in the context of the longitudinal axis A of the vehicle and are not intended to be limiting.

Turning now to FIG. 2, there is shown an exploded schematic view of an upside down step rail 14 and the illumination system 18, where the illumination system includes a wiring harness 70, light engines 72, an illumination device 74, and end caps 76. The wiring harness 70 is routed and secured within the containment channel 16 located on the underside of the step rail 14. The wiring harness 70 is designed to connect the illumination system 18 with the vehicle electrical system and includes one or more sealed connectors 80 for providing power and/or control signals to the light engines 72. The light engines 72 are electrically connected to the wiring harness 70 by way of the sealed connectors 80 and are arranged to shine light into axial ends of the illumination device 74 so that the light can be transmitted within the illumination device according to principals of total internal reflection (TIR). According to one embodiment, each of the light engines 70 is maintained within a sealed housing and includes light emitting diodes (LEDs) or other suitable light sources that can generate enough light to be uniformly distributed along the length of the illumination device 74. The illumination device 74 includes an elongated light pipe 90, first and second attachment wings 92, 94, and first and second axial ends 100, 102, as will be described in greater detail. Each axial end 100, 102 is preferably laser cut to include snaps or tabs 104 that facilitate connection with a corresponding light engine housing. The end caps 76 are designed to slide into axial ends of the step rail 14 so that the interior space 38 inside of the step rail is generally sealed off at the ends. It should be appreciated that the aforementioned description of illumination system 18 is non-limiting and is simply provided as an example of how such a system could be structured. Other illumination systems, including those with different combinations of components, may be used with the illumination device described and claimed herein.

Figure 4:
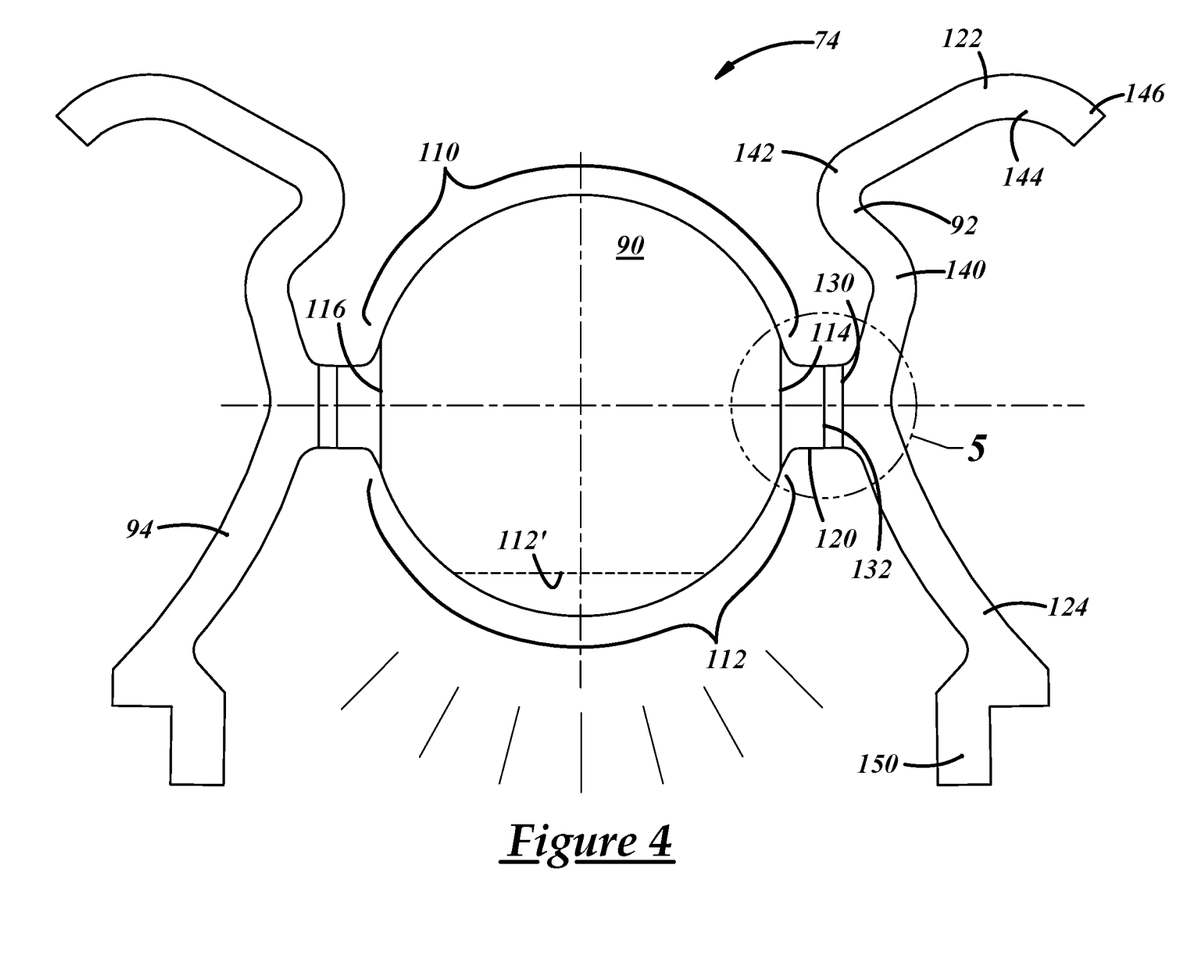
FIG. 4 is an enlarged cross-sectional view of the illumination device shown in FIG. 3.
Figure 5:
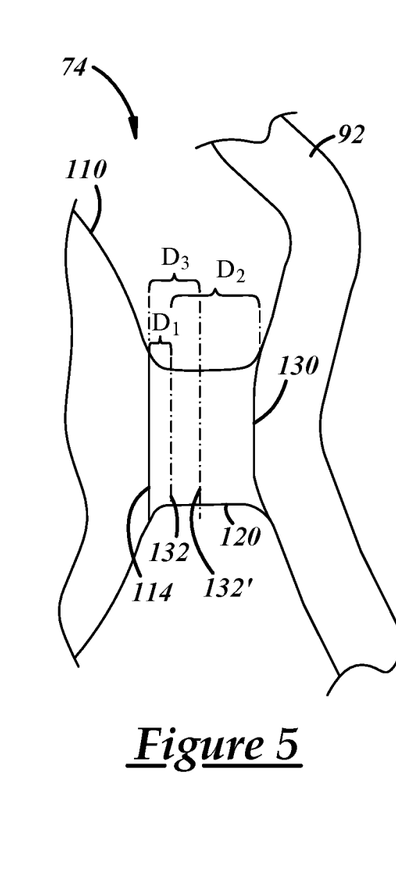
FIG. 5 is an enlarged cross-sectional view of a portion of the illumination device shown in FIG. 4.
Figure 6:
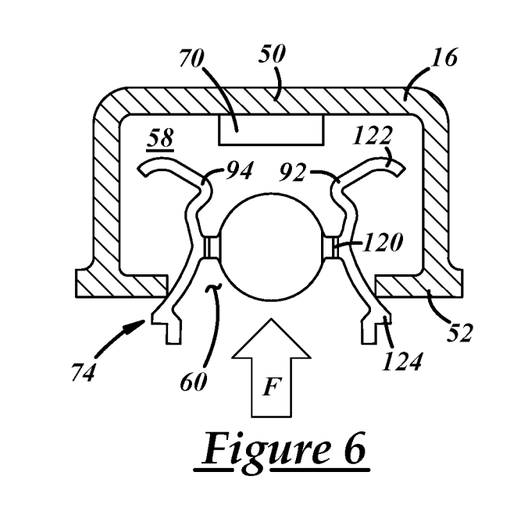
FIGS. 6-9 are a sequence of cross-sectional views of the illumination device in FIG. 3, where the sequence illustrates a process of installing the illumination device into a containment channel.

With reference to FIGS. 4 and 5, there is shown an embodiment of the illumination device 74 that is designed to resiliently fit within a channel, such as containment channel 16 located on the underside of the step rail 14, and includes an elongated light pipe 90 and first and second attachment wings 92, 94. One potential advantage of the present design is that the overall illumination device 74 is preferably made as a single extruded component having a co-extrusion boundary located between the different materials of the elongated light pipe 90 and each of the attachment wings 92, 94. By extruding or otherwise manufacturing the device as a unitary component, the present design is able to reduce the number of parts involved, minimize the complexity of the assembly process, and improve the overall durability or robustness of the device, to cite several possibilities. Since the first and second attachment wings 92, 94 are generally the same, except for being connected on opposing sides of the light pipe 90, only one of the wings is described below with the understanding that the description applies to both.

Elongated light pipe 90 is designed to receive light from a light engine 72 at an axial end 100, 102 and to transmit and distribute the light along its axial length so that it can illuminate the ground below. Because the light pipe 90 needs to transmit or convey light along at least a part of its axial length according to principals of total internal reflection (TIR), the light pipe is preferably made of an optically transmissive material, such as poly(methyl methacrylate) (PMMA). Of course, light pipe 90 is not limited to PMMA, as other transparent materials, including various types of thermoplastics, acrylics and/or glass compounds could be used instead. According to the non-limiting example shown in FIG. 4, the elongated light pipe 90 is an extruded optical core that generally has a circular cross-sectional shape and includes a reflecting side 110, an illuminating side 112, and first and second attachment sides 114, 116.

Reflecting side 110 is located towards the upper portion of the light pipe 90 and is designed to reflect or otherwise guide light back into the body of the light pipe. With reference to FIG. 4, the reflecting side 110 may include an outer surface of the upper half of the light pipe 90 anywhere between the first and second attachment sides 114, 116, as indicated by the curved bracket associated with reference numeral 110. In some instances, the reflecting side 110 may be coated along a portion of its axial length with a metallic or other reflective coating designed to promote internal reflection of the light. In other instances, the reflecting side 110 may be manufactured with various optics, such as laser or machine etched grooves or channels, configured to reflect light towards the illuminating side 112 so that it exits the light pipe. The exact positioning and arrangement of such optics may depend on a number of factors, including the relative axial distance from the light engine 72. Any suitable reflecting side feature may be employed to achieve the desired light distribution pattern.

Illuminating side 112 is located towards the lower portion of the light pipe 90, opposite the reflecting side 112, and is designed to allow light to escape the light pipe in order to illuminate the area below. The illuminating side 112 may include an outer surface of the lower half of the light pipe 90 anywhere between the first and second attachment sides 114, 116, as indicated by the curved bracket associated with reference numeral 112. The illuminating side is shown in the drawings as having a semi-circular shape, however, this is not mandatory. It is possible, for example, for the illuminating side to have a flat or other contoured shape; an example of which is shown in dashed lines and is identified as 112'. It is also possible for the illuminating side 112 to be coated with a suitable coating to promote refraction out of the light pipe or to be equipped with optics, like those on the opposing reflecting side 110, to control or influence the illumination pattern or distribution.

First and second attachment sides 114, 116 are located on the lateral portions of the light pipe 90 and are designed to connect with attachment wings 92, 94, respectively. Because the first and second attachment sides 114, 116 of this embodiment are of the same design, only side 114 is described below. It should be understood, however, that the following description applies to side 116 as well. The first attachment side 114 is integrally formed with the first attachment wing 92 and it can extend the entire axial length of the light pipe 90; the enlarged perspective view towards the bottom of FIG. 2 illustrates this lateral connection along the length of the light pipe. In addition to serving as a structural connection with the first attachment wing 92, the first attachment side 114 is proximate a transition region that includes a co-extrusion boundary 132 separating the different materials of the elongated light pipe 90 and the attachment wing 92. First attachment side 114 is illustrated in FIGS. 4 and 5 with a solid line that generally denotes a boundary or beginning of the transition region; however, it should be appreciated this line is for purposes of illustration, as actual manufactured parts may not contain such a definitive boundary or line at 114. The exact positioning of the co-extrusion boundary 132 can impact the optical performance of the light pipe, as well as the resiliency of the connection between components 90 and 92, as explained below in more detail.

First and second attachment wings 92, 94 are designed to resiliently snap into the containment channel 16 so that the illumination device 74 can be easily and securely installed on the underside of the step rail 14. Because the attachment wings 92, 94 need to flex slightly when they are snapped into the containment channel 16, but also need to be strong enough to firmly maintain the illumination device 74 in place, the attachment wings are preferably made of a strong resilient material, such as acrylonitrile butadiene styrene (ABS). Furthermore, it is desirable to prevent light within the elongated light pipe 90 from leaking into the attachment wings 92, 94, thus, instead of being made of optically transmissive material, the attachment wings are preferably made of a reflective and/or opaque material, such as a extruded-in-white ABS. Of course, the attachment wings are not limited to white ABS, as other types of strong, tough, resilient and/or opaque plastic materials could be used instead. According to the non-limiting example shown in FIG. 4, the first attachment wing 92 is a wing-like component that includes a bridge portion 120, an arm portion 122, and a leg portion 124. Since the first and second attachment wings 92, 94 of this embodiment are of the same design, only wing 92 is described below. It should be understood, however, that the following description applies to wing 94 as well.

Bridge portion 120 connects the first attachment wing 92 to the first attachment side 114 of the light pipe 90 and is also part of a transition region that includes a co-extrusion boundary between the materials of components 90 and 92. The bridge portion 120 may be located towards the middle of the first attachment wing 92 and is preferably thick enough to create a strong and resilient connection with the first attachment side 114 of the light pipe. For example, a light pipe 90 with a diameter of about 10 mm should have a bridge portion 120 with a thickness of about 2 mm. According to the illustrated embodiment, the bridge portion 120 laterally or outwardly extends from the first attachment side 114 of the light pipe to an outer end 130 and includes a co-extrusion boundary 132 located therebetween. The co-extrusion boundary separates the optically transmissive material of the light pipe 90 with the resilient material of the attachment wing 92 and may be a definitive boundary or interface or it may be a transitional region where one material fades into the other. By locating the co-extrusion boundary 132 in the transition region, the boundary or material interface is close enough to the light pipe so that the overwhelming majority of light in the light pipe is prevented from leaking out through the bridge portion. Depending on the materials and applications involved, the co-extrusion boundary 132 can be adjusted to optimize device performance. An example of this optimization is illustrated by boundary 132 which is located a position that is closer to the attachment side 114 of the light pipe 90 (distance $D_1$) than it is to the outer end 130 of the attachment wing 92 (distance $D_2$) so that the majority of light incident on side 114 is reflected back into the light pipe and does not leak out through the bridge portion 120. Co-extrusion boundary 132', on the other hand, is located about halfway between side 114 and end 130 and is spaced from the light pipe by a distance $D_3$ which may allow somewhat more light leakage, but can potentially provide more resiliency to the bridge portion.

Arm portion 122 extends upwards and away from the bridge portion 120 and, during installation within containment channel 16, is designed to resiliently flex within the channel. The exact configuration of the arm portion 122 can vary from the exemplary embodiment shown in the drawings, but according to that design, the arm portion 122 includes a series of bends or transitions 140, 142, 144 that culminate in a downwardly turned flange 146.

Leg portion 124 is the converse of arm portion 122 and extends downwards and away from the bridge portion 120 and is also designed to resiliently flex somewhat during installation of the illumination device 74 in the containment channel 16. The leg portion 124 preferably includes a stepped flange 150 that is sized and shaped to interact with the flange 62 of the containment channel 16. This interaction is described in the following paragraph in conjunction with FIGS. 6-9.

During manufacturing, the illumination device may be formed using one of a number of different co-extrusion process. For example, a method may include the following steps: providing an optically transmissive material to an extruding machine; providing a resilient material to the extruding machine; co-extruding the optically transmissive material and the resilient material to form a single extruded component that includes an elongated light pipe, at least one attachment wing, and a co-extrusion boundary separating the optically transmissive material from the resilient material (a non-limiting example of such a component is described above); and severing the co-extruded material at an axial end.

Figure 7:
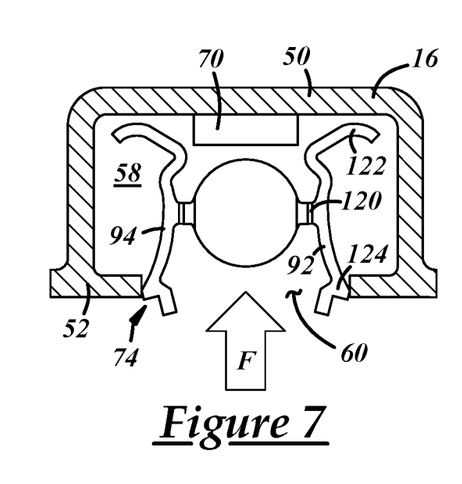
Figure 8:
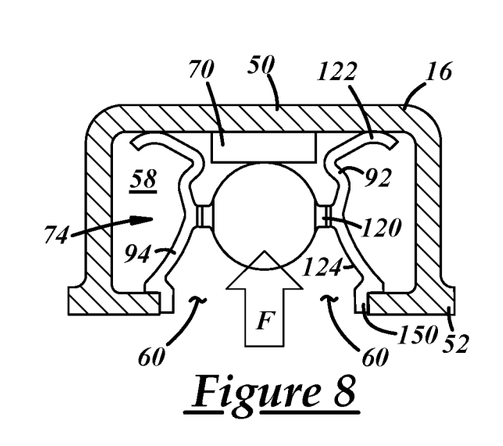
Figure 9:
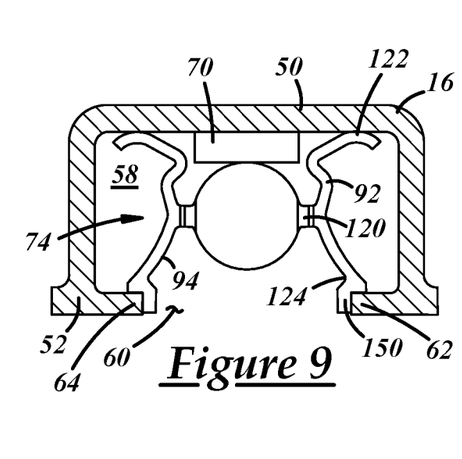

During installation, the illumination device 74 is first partially inserted into an axial end of the containment channel 16 and is then slid into place. This stage corresponds to FIG. 6, where it is seen that the arm portions 122 of the first and second attachment wings 92, 94 are fully inserted within the interior space 58 of the containment channel 16, whereas the leg portions 124 of the same attachment wings are not. Next, an upward force F is applied to the illumination device 74 so that the leg portions 124 of the first and second attachment wings 92, 94 are resiliently urged or squeezed together so that they fit through the elongated opening 60 in the containment channel 16. This stage is illustrated in FIG. 7. Continued upward force F causes the arm portions 122 of the first and second attachment wings 92, 94 to contact an interior surface of the containment channel surface 50 and deflect slightly downwards, towards leg portions 124; this downward deflection or urging may also result in the flanges 146 of wings 92, 94 spreading out from one another. At the same time, the leg portions 124 have been pushed far enough up into the interior space 58 of the containment channel 16 so that stepped flanges 150 clear the elongated opening 60 and nest with the pair of flanges or edges 62, 64 in the channel. This stage is reflected in FIG. 8. At this stage, the upward force F that is used to install the illumination device 74 into the containment channel 16 can be removed and the illumination device will remain aligned and firmly secured within the channel, as shown in FIG. 9.

It should be appreciated that the aforementioned installation process can be carried out without the need for additional mounting hardware, sealant or adhesives to attach the illumination device 74 and/or illumination system 18 to the underside of the step rail 14. Thereby reducing complexity for both assembly and installation.

It is to be understood that the foregoing is a description of one or more preferred exemplary embodiments of the invention. The invention is not limited to the particular embodiment(s) disclosed herein, but rather is defined solely by the claims below. For example, even though all of the illustrated embodiments show two attachment wings that are mirror images of one another, it is possible for the illumination device to include more or less than two attachment wings and/or to include attachment wings that are not mirror images and are, thus, different from one another. As another example, one or more of the different components of the illumination device, such as the elongated light pipe, may have a non-uniform cross-sectional shape and/or size along its length. It is also possible for various types of known optics or other light reflecting and/or refracting features to be applied to the illumination device described herein, as well as elongated and transparent covers or lens to enclose openings 40 and/or 60. The statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. An illumination device for installation in a containment channel, comprising:
    an elongated light pipe made of an optically transmissive material and having a reflecting side that reflects light within the light pipe, an illuminating side that allows light to escape the light pipe, a first attachment side, and a second attachment side;
    a first attachment wing made of a resilient material and having a first bridge portion that connects the first attachment wing to the first attachment side of the elongated light pipe, a first arm portion that extends away from the first bridge portion, and a first leg portion that extends away from the first bridge portion such that the first bridge portion is located between the first arm and leg portions, the first arm and leg portions are both configured to contact the containment channel; and
    a second attachment wing made of a resilient material and having a second bridge portion that connects the second attachment wing to the second attachment side of the elongated light pipe, a second arm portion that extends away from the second bridge portion, and a second leg portion that extends away from the second bridge portion such that the second bridge portion is located between the second arm and leg portions, the second arm and leg portions are both configured to contact the containment channel;
    wherein the illumination device is configured so that, during installation of the illumination device in the containment channel, the first and second attachment wings resiliently snap into the containment channel and securely maintain the illumination device in place.

2. The illumination device of claim 1, wherein the illumination device is a single extruded component having a first co-extrusion boundary separating the optically transmissive material of the elongated light pipe and the resilient material of the first attachment wing, and a second co-extrusion boundary separating the optically transmissive material of the elongated light pipe and the resilient material of the second attachment wing.

3. The illumination device of claim 1, wherein the optically transmissive material of the elongated light pipe is transparent and includes poly(methyl methacrylate) (PMMA).

4. The illumination device of claim 1, wherein the reflecting side of the elongated light pipe is located in an upper portion of the elongate light pipe between the first and second attachment sides and includes at least one of a reflective coating designed to reflect light within the light pipe, or optics designed to reflect light towards the illuminating side of the elongated light pipe.

5. The illumination device of claim 4, wherein the illuminating side of the elongated light pipe is located in a lower portion of the elongated light pipe between the first and second attachment sides and is opposite the reflecting side of the elongated light pipe.

6. The illumination device of claim 1, wherein the resilient material of at least one of the first or second attachment wings is opaque and includes acrylonitrile butadiene styrene (ABS).

7. The illumination device of claim 1, wherein at least one of the first or second bridge portions includes a transition region with a co-extrusion boundary between the optically transmissive material of the elongated light pipe and the resilient material of an attachment wing.

8. The illumination device of claim 7, wherein the transition region extends between an attachment side of the elongated light pipe and an outer end of an attachment wing, and the co-extrusion boundary is located within the transition region at a position that is closer to the attachment side of the elongated light pipe (distance $D_1$) than the outer end of the attachment wing (distance $D_2$).

9. The illumination device of claim 1, wherein at least one of the first or second arm portions extends upwards and away from a bridge portion and includes a downwardly turned flange, the at least one first or second arm portion is configured so that, during installation of the illumination device in the containment channel, the downwardly turned flange is pressed against an interior surface of the containment channel and is urged downwards towards one of the first or second leg portions.

10. The illumination device of claim 1, wherein at least one of the first or second leg portions extends downwards and away from a bridge portion and includes a stepped flange, the at least one first or second leg portion is configured so that, during installation of the illumination device in the containment channel, the stepped flange is squeezed through an opening in the containment channel and is urged inwards towards the other of the first or second leg portions.

11. The illumination device of claim 1, wherein the first and second attachment wings are configured so that, following installation of the illumination device in the containment channel, the first and second arm portions are pressed against an interior surface of the containment channel and are urged downwards towards the first and second leg portions, respectively, the first and second leg portions are squeezed in an opening in the containment channel and are urged inwards towards one another, and first and second stepped flanges located at the ends of the first and second leg portions, respectively, are engaged against corresponding flanges defining the opening in the containment channel so that the illumination device is secured within the containment channel.

12. The illumination device of claim 1, wherein the elongated light pipe further includes at least one axial end that is configured to receive light from a light engine so that the light can be introduced within the light pipe.

13. A step rail assembly for a vehicle, comprising: a step rail with an elongated opening on an underside and the illumination device of claim 1, wherein the containment channel is mounted in the elongated opening of the step rail, the illumination device is installed within the containment channel, and the illumination device is arranged to emit light downwards towards the ground in an area proximate the step rail assembly.

14. An illumination device for installation in a containment channel, comprising:
an elongated light pipe made of an optically transmissive material and having a reflecting side that reflects light within the light pipe, an illuminating side that allows light to escape the light pipe, and at least one attachment side; and
at least one attachment wing made of a resilient material and having a bridge portion that integrally joins the attachment wing to the attachment side of the elongated light pipe, the attachment wing is configured to help secure the illumination device in the containment channel;
the illumination device is a single extruded component that has a co-extrusion boundary separating the optically transmissive material of the elongated light pipe from the resilient material of the attachment wing;
wherein the bridge portion includes a transition region that extends between the attachment side of the elongated light pipe and an outer end of the attachment wing, and the co-extrusion boundary is located within the transition region at a position that is closer to the attachment side of the elongated light pipe to with distance $D_1$ than the outer end of the attachment wing with distance $D_2$.

15. The illumination device of claim 14, wherein the optically transmissive material of the elongated light pipe is transparent and includes poly(methyl methacrylate) (PMMA).

16. The illumination device of claim 14, wherein the resilient material of the attachment wing is opaque and includes acrylonitrile butadiene styrene (ABS).

17. The illumination device of claim 14, wherein the attachment wing is configured so that, following installation of the illumination device in the containment channel, an arm portion of the attachment wing is pressed against an interior surface of the containment channel and is urged downwards, a leg portion of the attachment wing is squeezed in an opening in the containment channel and is urged inwards, and a stepped flange is located at an end of the leg portion and is engaged against a corresponding flange that partially defines the opening in the containment channel so that the illumination device is secured within the containment channel.

18. The illumination device of claim 14, wherein the elongated light pipe further includes at least one axial end that is configured to receive light from a light engine so that the light can be introduced within the light pipe.

19. A step rail assembly for a vehicle, comprising: a step rail with an elongated opening on an underside and the illumination device of claim 14, wherein the containment channel is mounted in the elongated opening of the step rail, the illumination device is installed within the containment channel, and the illumination device is arranged to emit light downwards towards the ground in an area proximate the step rail assembly.

20. A method of manufacturing an illumination device, comprising the steps of:
providing an optically transmissive material to an extruding machine;
providing a resilient material to the extruding machine;
co-extruding the optically transmissive material and the resilient material to form a single extruded component that includes an elongated light pipe, at least one attachment wing, and a co-extrusion boundary separating the optically transmissive material from the resilient material; and severing the co-extruded material at an axial end, wherein:

the elongated light pipe is formed from the optically transmissive material and has a reflecting side that reflects light within the light pipe, an illuminating side that allows light to escape the light pipe, and at least one attachment side;

the attachment wing is formed from the resilient material and has a bridge portion that integrally joins the attachment wing to the attachment side of the elongated light pipe, the attachment wing is configured to help secure the illumination device in a containment channel, the bridge portion includes a transition region that extends between the attachment side of the elongated light pipe and an outer end of the attachment wing; and the co-extrusion boundary is located within the transition region at a position that is closer to the attachment side of the elongated light pipe with distance $D_1$ than the outer end of the attachment wing with distance $D_2$.

* * * * *